D. WOODHEAD.
CABLE TERMINAL.
APPLICATION FILED AUG. 3, 1916.
1,227,726.
Patented May 29, 1917.
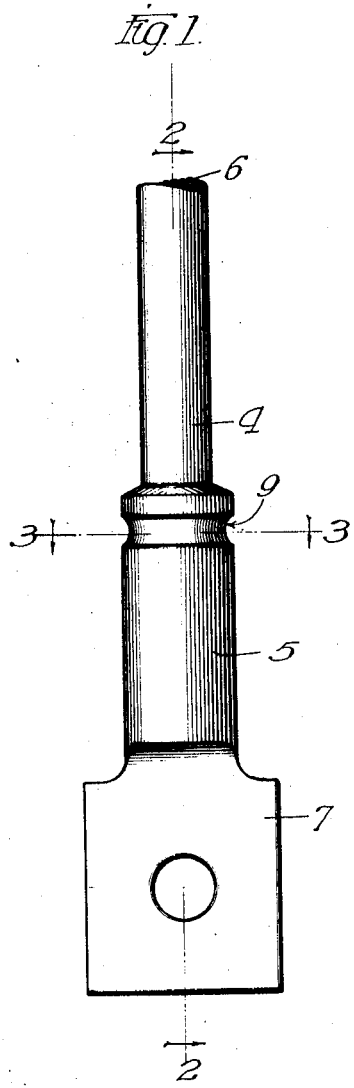
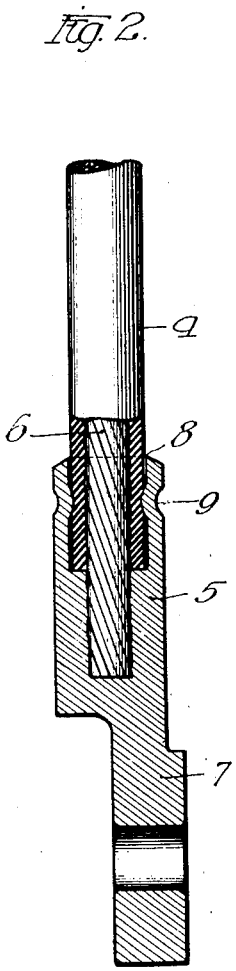
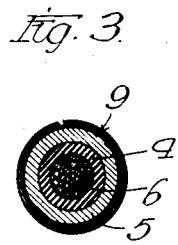
Witnesses:
Inventor
Daniel Woodhead,
By Charles C. Bulkley,
Atty

UNITED STATES PATENT OFFICE.

DANIEL WOODHEAD, OF CHICAGO, ILLINOIS, ASSIGNOR TO CENTRAL ELECTRIC COMPANY, OF CHICAGO, ILLINOIS, A CORPORATION OF ILLINOIS.

CABLE-TERMINAL.

1,227,726.   Specification of Letters Patent.   Patented May 29, 1917.

Application filed August 3, 1916.   Serial No. 112,920.

*To all whom it may concern:*

Be it known that I, DANIEL WOODHEAD, a citizen of the United States of America, and resident of Chicago, Cook county, Illinois, have invented a certain new and useful Improvement in Cable-Terminals, of which the following is a specification.

My invention relates to improvements in cable terminals, and particularly to terminals for use in connection with storage batteries, or other electrical devices, in which the cable is subjected to the deteriorating action of acids or other chemicals.

The object of my invention is not only to provide an improved terminal which is of such character as to prevent any deteriorating action taking place, but also consists in an improved method of forming such terminals.

The cables employed in connection with storage batteries are usually provided with an insulating coating of rubber, or some rubber compound, which is of such a character that it is not affected or deteriorated by contact with the electrolyte of the battery. These cables terminate in a lead connecting end or terminal. Heretofore it has been found that it is difficult to obtain a satisfactory connection between the insulated cable and the metallic terminal, difficulty being experienced in that the acid works between the two members and thus gains access to the conducting wires of the terminal, and in this manner rapidly deteriorates the cable.

In order that my invention may be more clearly understood, I represent in the accompanying drawing a terminal constructed in accordance with my invention, in which—

Figure 1 shows a front elevation of such a terminal.

Fig. 2 is a sectional view taken on the line 2—2 of Fig. 1.

Fig. 3 is a sectional view taken on the line 3—3 of Fig. 1.

In these drawings, I have shown a cable 4, consisting of a bundle of conducting wires 6, preferably copper, covered by an insulating coating 4. This insulating coating can be of any desired material, but, as above stated, is preferably made of rubber or a rubber compound of such a character that it will not be attacked by acid or other chemicals used in connection with storage batteries. The particular insulating compound employed, however, forms no part of my present invention. The insulation is cut away from the end portion of the cable, leaving the ends of the wires 6 exposed, and then the lead-connecting terminal 7 is molded around the end of this cable. While I prefer to mold the terminal 7 to the end of the insulated cable, other methods of attachment might be employed.

In practice, it is found that after the lead terminal has thus been molded, onto the end of the insulated cable, as above described, that as the metal cools, it contracts and separates slightly from the insulation of the cable, thus leaving a small space 8 through which acid or other liquid gradually works until it comes in contact with the ends of the conductors 5. Once the acid reaches these conductors it rapidly advances upward through the inside of the cable on account of the capillary attraction, and thus the wires are attacked by this acid and rapidly deteriorates, thus tending to greatly lessen the efficiency and life of the cable, In order to prevent the acid from thus attacking the conductors of the cable, I have conceived the idea of first permitting the lead to cool, after the same has been molded about the end of the cable, and in then pressing the shank portion of the terminal 7 into firm connection with the insulated covering by means of one or more crimps 9. In other words, after the lead has cooled, and thus, owing to the contraction of the metal has separated slightly from the insulated covering, I again force this lead into close engagement with the insulation of the cable. In this manner, I securely and efficiently close the space 8, and so prevent any liquid from working between the shank of the lead terminal 7 and the insulating coating 4 of the cable. In this manner the conducting wires 6 are thoroughly and efficiently protected and no acid or other liquid can reach them, and thus the life of the cable is greatly increased.

What I claim as my invention is:

1. The method of forming a cable terminal which consists in first removing the insulation from the end of an insulated cable, then molding a metallic connecting terminal to the end of this cable, permitting the metal to cool, and then applying pressure to the metal surrounding the end portion of the terminal in such a manner as to form one or more circular grooves in said metal to thus force the same into close connection with said insulated cable.

2. The method of forming a cable terminal which consists in taking a cable having an acid-proof insulating covering, molding about the end of the same an acid-proof metallic terminal, permitting said metal to cool, and then applying pressure to said metal to force the same into close connection with said insulating covering.

3. The method of forming a cable terminal which consists in taking a cable having an acid-proof insulating covering, molding about the end of the same an acid-proof metallic terminal, permitting said metal to cool, and in then forming by pressure one or more circular grooves in said metal to force same into close connection with said insulating covering.

Signed by me at Chicago, Illinois, this 31st day of July, 1916.

DANIEL WOODHEAD.

Witnesses:
JOHN R. OLSEN,
E. C. BOWYER.